United States Patent [19]

Holma et al.

[11] 4,215,957

[45] Aug. 5, 1980

[54] CUTTING INSERT FOR CHIPFORMING MACHINE

[75] Inventors: Johan E. Holma, Sandviken; Ake A. Andersson, Kungsgarden; Nils L. Gavlefors, Sandviken, all of Sweden

[73] Assignee: Sandvik Aktiebolag, Sandviken, Sweden

[21] Appl. No.: 943,641

[22] Filed: Sep. 19, 1978

[30] Foreign Application Priority Data

Sep. 17, 1977 [SE] Sweden ............................... 7710434

[51] Int. Cl.² ............................................. B26D 1/12
[52] U.S. Cl. ................................................... 407/114
[58] Field of Search ............................... 407/114, 115

[56] References Cited

U.S. PATENT DOCUMENTS

| | | |
|---|---|---|
| 3,815,191 | 6/1974 | Holma .................................. 407/114 |
| 3,815,192 | 6/1974 | Ohtsu et al. .......................... 407/114 |
| 3,827,119 | 8/1974 | Bennett ................................ 407/114 |
| 3,885,281 | 5/1975 | Stambler .............................. 407/114 |
| 3,973,308 | 8/1976 | Lundgren ............................. 407/114 |
| 4,140,431 | 2/1979 | Friedline et al. ..................... 407/114 |

Primary Examiner—Harrison L. Hinson
Attorney, Agent, or Firm—Burns, Doane, Swecker & Mathis

[57] ABSTRACT

A cutting insert for chipforming machining of workpieces is of the type comprising a rake face and a clearance face. At least one cutting edge is formed by the transition between the rake and clearance faces. The cutting edge is intersected by depressions extending along the rake face. The greatest dimension of each depression in a direction parallel to its associated cutting edge is greater than the distance between adjacent depressions.

9 Claims, 10 Drawing Figures

U.S. Patent  Aug. 5, 1980  Sheet 2 of 2  4,215,957
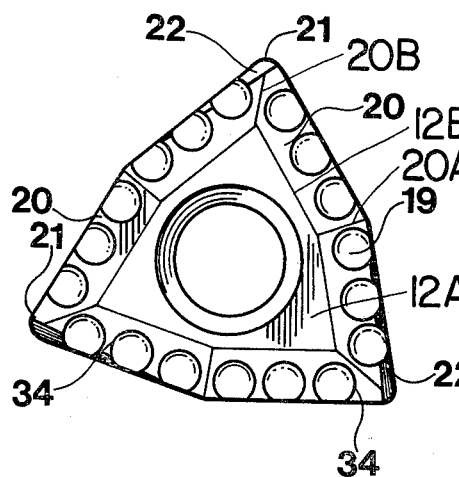
Fig.6
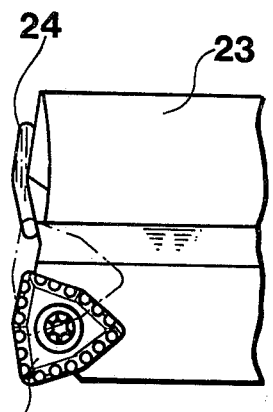
Fig.7A
Fig.7B
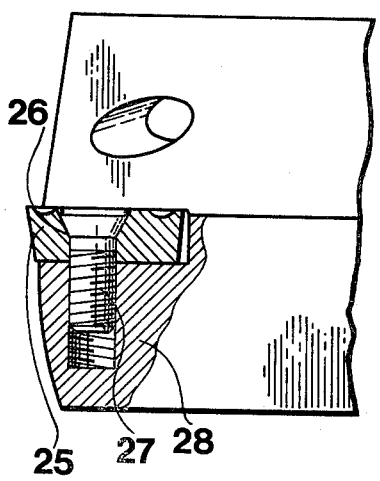
Fig.8
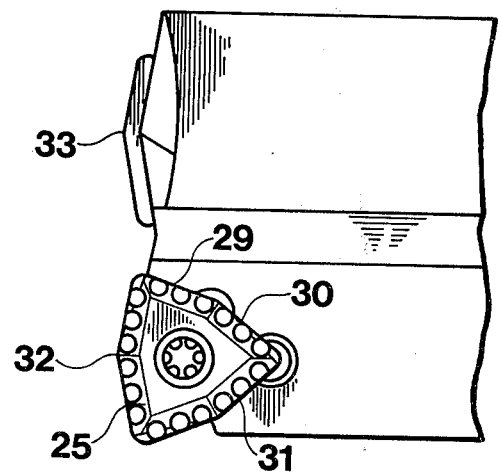
Fig.9

CUTTING INSERT FOR CHIPFORMING MACHINE

BACKGROUND AND OBJECTS OF THE INVENTION

The present invention relates to cutting inserts for chipforming machining of preferably metallic work places.

Such cutting inserts are normally provided with one or more cutting edges formed by the transition between the top surfaces or rake faces of the insert and its side surfaces or clearance faces.

In cutting operations, the breaking of the chip and the shape of the chip are often of great importance for an undisturbed production. In modern, high-productive machines or tools there are great demands upon an efficient removal of the chips. Long and uncontrolled chips can easily cause breakdowns and rejections and they also mean great risks for accidents. The chip control has therefore to be carefully regarded and it determines the design of the tools to a great extent.

It is known that different effects regarding chip breaking and chip removal can be obtained by means of different kinds of depressions in the rake face of a cutting tool. As an example, by supplying the rake face of the cutting tool with notches or grooves extending essentially in the direction of motion of the chip, a partition or longitudinal breakage of the chip has been obtained leading to an easier removal of the chip. In other cases, a special plastic deformation of the chip has been reached by shaping the depression or grooves in a somewhat different way, meaning that the chip has obtained a stiffened bead or bend. This phenomenon has in its turn caused effects of a favorable nature regarding the chip removal such as, for example, a decrease of the width or a decreased radius of curvature of the chip.

It is also known to provide the rake face with depressions not intended to cause any breaking or plastic deformation of the chip, altogether. On the other hand, it is also known to use depressions or chip breaker grooves which cause various kinds of chip upsetting, breaking or plastic deformation acting separately or in combination depending upon the actual cutting conditions.

Thus, by special shaping of the grooves or the depressions applied on the rake faces of cutting inserts, completely new and unexpected effects can be reached.

It is, therefore, an object of the present invention to provide a novel cutting insert.

It is another object of the invention to provide a cutting insert which requires less cutting forces.

It is a further object of the invention to provide a cutting insert which performs satisfactorily within a wide range of cutting speeds.

It is yet another object of the invention to provide a cutting insert which facilitates guidance of a drill where separate guide pads are omitted.

It is still another object of the invention to provide a cutting insert which increases the plastic deformation or stiffening of the chips.

BRIEF SUMMARY OF A PREFERRED EMBODIMENT OF THE INVENTION

According to the invention there is now available a cutting insert which means improved breaking and removal of the chip in comparison with earlier known cutting inserts (used under similar conditions) and which has shown superior properties during strongly varying cutting conditions.

The cutting insert, whose cutting edges are broken through by grooves or depressions extending on the rake face and outgoing from the broken part of the cutting edge, is characterized in, that the depressions are successively situated along the cutting edge or edges and being so shaped that their width or greatest dimension parallel to the cutting edge is greater than the distance between two adjacent or successive depressions.

Normally, the depressions are provided with a rear or inner limitation situated within or on the very rake face. The length of the depressions are preferably of generally the same size as their width.

By virtue of such relationship between the size of the depressions and the size of the remaining, normal part of the rake face or the cutting edge it has been possible to increase range of known insert geometries and cutting applications. Among suitable insert geometries there can particularly be mentioned those forms provided with bent or broken cutting edges which form points intermediate the insert corners.

The invention has advantageously been used in cutting operations such as for example, drilling by means of angle-broken, triangular indexed cutting inserts, so called "trigon" or trigonal shaped inserts.

THE DRAWING

The invention is closer described in the following specification with appended drawings showing:

FIG. 1, a plan view of a cutting insert according to the invention showing the top surface;

FIG. 2, a sectional view taken along the line A—A in FIG. 1 showing a transverse section of the cutting insert;

FIG. 3, a sectional view taken along the line B—B in FIG. 1 showing a plane face along the cutting edge;

FIG. 4, a plan view of another embodiment of cutting insert according to the invention, showing the top surface;

FIG. 5, an enlarged view of the corner of the cutting insert in FIG. 4;

FIG. 6, a plan view of a third embodiment of cutting insert according to the invention showing the top surface;

FIG 7A, a side view of a boring tool provided with a cutting insert according to the invention;

FIG. 7B, a schematic representation depicting the outer radial part of a hole cut by the outer insert and the inner radial part of a hole cut by the inner insert;

FIG. 8, a side view of a boring tool according to FIG. 7A, with a portion broken away to depict the mounting of the cutting insert into the tools; and FIG. 9, an enlarged view of FIG. 7.

DETAILED DESCRIPTION OF A PREFERRED EMBODIMENT OF THE INVENTION

Figure 1:
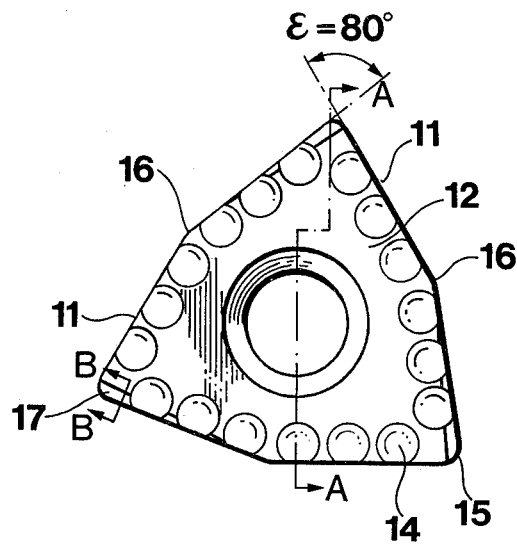
Figure 2:
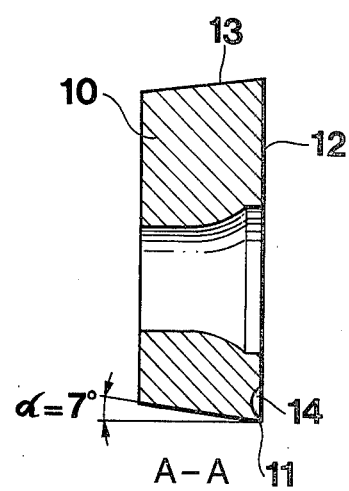
Figure 3:
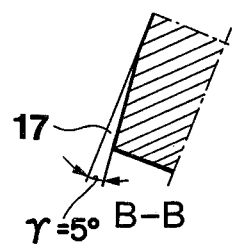

The cutting insert 10 shown in FIGS. 1–3 is provided with cutting edges 11 formed by the transition, i.e., intersection, between the rake face or top surface 12 and the side surfaces or clearance face 13. The cutting edge is intersected by spaced grooves or depressions 14 extending on the rake face starting from the cutting edge. The cutting insert is provided with nonlinear cutting edges, i.e., curved or broken cutting edges (forming points 16) making an angle between the insert corners 15. The depressions preferably have a maximum width (i.e., dimension parallel to the cutting edge) which is greater than the spacing between the depressions. By increasing the width of the depressions at the very cutting edge, i.e., the notches in the cutting edge, an increased plastic deformation or stiffening of the chip is obtained. This can be desirable at certain cutting conditions. In order to avoid an unduly great weakening of the cutting edge, the length of the "un-notched" intermediate parts of the cutting edge is made at least equal to or greater than half the width of the depressions.

It has been found possible, however, to reach an increased plastic deformation of the chip also in other ways than by the mentioned increase of the width of the depressions. By making the transition between the rake face and the cutting edge or the depression, respectively, as distinct as possible, i.e., providing the transition zone with an essentially sharp edge, the discussed effect of the depressions has been strengthened.

The sides or legs of the cutting edges which form the corners 15 are situated outside the imagined straight connection line or diagonal between the corners of the insert. The intersection between sides of two corners forms the intermediate corner or point 16. The rake face is also provided with a plane face or land 17 along the cutting edge, the width of the face, i.e., the dimension extending perpendicular to the cutting edge and parallel to the top surface, decreasing in the direction from the corner to the center or angle turning point 16 of the cutting edge. In the shown embodiment the face forms a negative angle $\gamma$ of 5° (FIG. 3).

The cutting insert can be provided with a clearance angle $\alpha$, whose size is 7° in the embodiment shown. The point angle $\epsilon$ between two cutting edges intersecting each other at one of the insert corners can vary depending upon the angle turning of the cutting edge, but it is preferably 80° in the embodiment shown.

Figure 4:
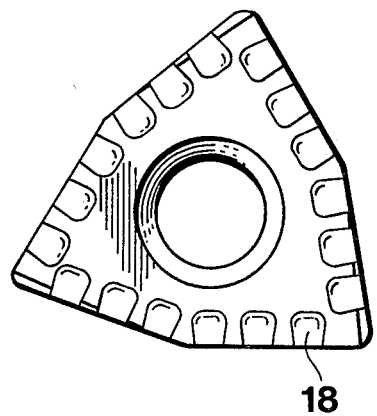
Figure 5:
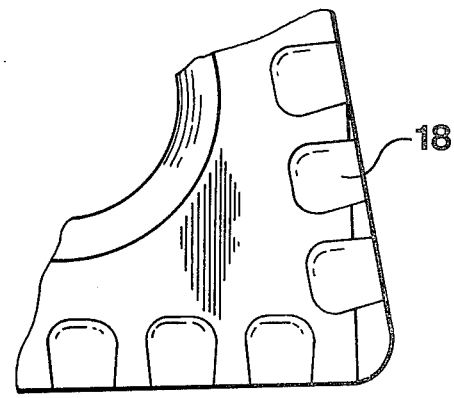

FIGS. 4 and 5 show a cutting insert in which the depressions 18 have a less rounded form in comparison with the earlier shown cutting insert. The embodiment can preferably be used for materials being more difficult to act upon than normal. In this embodiment the depressions, when viewed in plan, are generally rectangular, with the inner corners, i.e., those spaced from the cutting edge, being rounded.

FIG. 6 shows a cutting insert provided with notches 19 through the cutting edge, as described before, but it is also provided with chip breaker grooves 20 along the cutting edge. The grooves 20 can be formed so that a positive, neutral or negative rake face is obtained. The grooves are inclined relative to the remaining portion 12A of the top surface and form edges 12B therewith. The grooves along each cutting edge intersect to form peaks 20A, while the grooves which intersect at the corners 15 form valleys 20B. The very corner area 21 can also be provided with grooves or depressions as is similar to the embodiments shown earlier, but it is normally provided with a planar land or negative strengthening face 22. Thus, an increased upsetting of the material beyond the normal deformation is generally not desirable at the corner area of the insert. The insert geometry which means a combination of notches through the cutting edge and a chip breaking groove along the cutting edge gives an essential increase of the area of the application because the feed can be varied within broad ranges. At small feeds a harder chipbreaking is needed and the notches through the cutting edges are acting. At larger feeds the action of the notches are of less significance but the required, relatively soft chipbreaking is supplied by means of the chip breaker groove.

The embodiment having a chipbreaker groove also gives reduced cutting forces because these grooves per se mean an increased positive rake angle. In this case it has been found not as necessary to have a distinct or sharp transition 34 between the depressions and rake face or cutting edge, respectively (made for example by means of grinding the top surface of the insert), compared to the earlier mentioned embodiments.

From a functional point of view it has been considered essential that the notches through the cutting edge shall have a diverging, greater rake angle in the direction of the feed than the rake angle of the rake face or the chipbreaker groove.

FIGS. 7–9 show schematically a boring tool 23 provided with two cutting inserts according to the invention. The inner insert 24 has its cutting action directed towards and over the center of the drill and radially overlaps the path of the outer insert 25 which cuts out the outer diameter of the bore hole (see FIG. 7). The insert is provided with a clearance angle and form-sintered chipbreakers, meaning a positive rake angle (see FIG. 8). The cutting insert 25 is provided with a conical hole 26 and it is fastened to a cutting seat 28 by means of a screw 27. The seat is provided with supports 29, 30, 31 adjusted to the form of the insert so that a three point contact has been obtained.

The chosen boring insert geometry with "angle-broken" cutting edges results, according to shown embodiment, in a cutting insert configuration having special insert points 32, 33 or protruding edges. These points have proved to be of essential importance for the guidance of the drill particularly in those cases where separate supporting plates, guide pads or similar are missing. The eariler mentioned plane face 17 is provided in such a way that its width is as greatest where the cutting speed is as smallest, i.e., at the center of rotation of the drill (see FIG. 7).

In the following example there are shown some of the cutting results which have been possible to obtain by means of cutting tools according to the invention.

Cutting was performed in the way of boring by means of a tool having the shape shown earlier, the speed of the spindle (n) being 1570 rpm and the cutting speed (v) being 163 m/min. In two different materials being cut, as normal carbon steel (No. 1672) and case-hardening steel (No. 2511), the feed(s) was varied according to the following steps: 0.070, 0.126, 0.182, 0.252 and 0.336 mm/min. In a third material being stainless steel (No. 2333) the feed(s) was varied according to the following steps: 0.182, 0.210, 0.252, 0.308 and 0.336 mm/min. In all cases there was obtained satisfactory chip formation and chip removal. At the lowest feeds the chips had obtained a heavy deformation over the transverse section showing several protruding beads and an essential increase of the "coiling up" i.e., a decrease of the radius of curvature. At greater feeds, i.e., thicker chips, the presence of beads or stiffened parts was less remarkable.

In comparison with earlier used drills for the same range of uses, i.e., twist drills, there was obtained a considerably swifter cutting or sinking and no interruptions were observed at highly varying cutting data and materials.

Generally, in cutting operations using tools according to the invention, there have been experienced, that the higher the cutting speed, the better functions the chip breaking by means of the notches through the cutting edges.

Although the invention has been described in connection with a preferred embodiment thereof, it will be appreciated by those skilled in the art that additions, substitutions, modifications and deletions not specifically described may be made without departing from the spirit and scope of the invention as defined in the appended claims.

What is claimed is:

1. A cutting insert for use in the chipforming machining of workpieces, said insert comprising a rake face and a clearance face, at least one cutting edge formed by the intersection of the rake and clearance faces, said cutting edge being intersected by spaced depressions extending along said rake face, the depth of each depression initially increasing in a direction away from said cutting edge and thereafter decreasing in said direction.

2. A cutting insert according to claim 1, wherein said cutting edge is nonlinear.

3. A cutting insert according to claim 1, wherein said cutting edge is formed between two corners of the insert and comprises two outwardly directed cutting edge portions defining an obtuse angle therebetween and form a point intermediate adjacent corners.

4. A cutting insert according to claim 1, wherein said rake face is provided with a planar land situated along the cutting edge, the width of the planar land decreasing in the direction from a corner of the insert towards the center of the cutting edge.

5. A cutting insert according to claim 1, wherein said depressions are shaped with an essentially sharp transition edge relative to the cutting edge or rake face, respectively.

6. A cutting insert according to claim 1, wherein the depressions each include a rear or inner border lying within or upon the rake face.

7. A cutting insert according to claim 1, wherein the greatest dimension of the depressions perpendicular to the cutting edge is substantially the same as the width.

8. A cutting insert according to claim 1, including one or more chip breaker grooves formed as a depression in the rake face extending along the cutting edge.

9. A cutting insert for chipforming machining of workpieces, said insert being of the type comprising a rake face and a clearance face, at least one cutting edge formed by the transition between the rake and clearance faces, said cutting edge being intersected by depressions extending along said rake face, the improvement wherein the greatest dimension of each depression in a direction parallel to its associated cutting edge is greater than the distance between adjacent depressions, said rake face provided with a planar land situated along the cutting edge, the width of the planar land decreasing in the direction from a corner of the insert towards the center of the cutting edge.

* * * * *